US009169344B2

(12) United States Patent
Hood et al.

(10) Patent No.: US 9,169,344 B2
(45) Date of Patent: Oct. 27, 2015

(54) REACTIVE SOLUTION OF POLYMERIZABLE POLYMER COMPRISING POLYMERIZABLE REACTIVE FUNCTIONALITIES, PROCESS AND COMPOSITIONS THEREOF

(75) Inventors: David K. Hood, Basking Ridge, NJ (US); Osama M. Musa, Kinnelon, NJ (US); Surya Kamin, Skillman, NJ (US); John Mckittrick, Jersey City, NJ (US)

(73) Assignee: ISP INVESTMENTS INC., Wilmington, DE (US)

( * ) Notice: Subject to any disclaimer, the term of this patent is extended or adjusted under 35 U.S.C. 154(b) by 373 days.

(21) Appl. No.: 13/511,208

(22) PCT Filed: Nov. 19, 2010 (Under 37 CFR 1.47)

(86) PCT No.: PCT/US2010/057324
§ 371 (c)(1), (2), (4) Date: Sep. 5, 2012

(87) PCT Pub. No.: WO2011/063171
PCT Pub. Date: May 26, 2011

(65) Prior Publication Data

US 2013/0085230 A1 Apr. 4, 2013

Related U.S. Application Data

(60) Provisional application No. 61/263,570, filed on Nov. 23, 2009, provisional application No. 61/288,625, filed on Dec. 21, 2009.

(51) Int. Cl.

| | |
|---|---|
| ***C08G 65/14*** | (2006.01) |
| ***C08G 65/02*** | (2006.01) |
| ***C08F 277/00*** | (2006.01) |
| ***C08F 8/00*** | (2006.01) |
| ***C08F 226/06*** | (2006.01) |
| ***C08F 226/10*** | (2006.01) |
| ***C09D 139/02*** | (2006.01) |
| *C08G 65/00* | (2006.01) |
| *C08F 287/00* | (2006.01) |
| *C08F 220/26* | (2006.01) |
| *C08F 220/30* | (2006.01) |

(52) U.S. Cl.
CPC ................ *C08F 277/00* (2013.01); *C08F 8/00* (2013.01); *C08F 226/06* (2013.01); *C08F 226/10* (2013.01); *C09D 139/02* (2013.01); *C08F 220/26* (2013.01); *C08F 220/30* (2013.01)

(58) Field of Classification Search
CPC ...................................................... C08G 65/14
USPC .............. 524/68, 69, 501, 504, 524; 528/393; 525/117, 386, 377
See application file for complete search history.

(56) References Cited

U.S. PATENT DOCUMENTS

| | | | |
|---|---|---|---|
| 3,519,702 | A | 7/1970 | Wear et al. |
| 4,788,258 | A | 11/1988 | Collins et al. |
| 5,712,356 | A | 1/1998 | Bothe et al. |
| 6,086,911 | A | 7/2000 | Godbey |
| 2007/0231286 | A1 | 10/2007 | Botschka et al. |

FOREIGN PATENT DOCUMENTS

| | | |
|---|---|---|
| WO | WO95/19378 | 7/1995 |

*Primary Examiner* — Duc Truong
(74) *Attorney, Agent, or Firm* — Thompson Hine LLP; William J. Davis

(57) ABSTRACT

Disclosed herein a process for the preparation of reactive solution of polymerizable polymers comprising polymerizable reactive functionality and wherein one approach discloses a polymerizable polymer comprising a (i) N-vinyl amide monomer; (ii) dual functional monomer; and (iii) polymerizable monomelic solvent. An additional approach reveals about polymerizable polymer comprising (i) a base polymer made from N-vinyl amide monomer and a co-monomer with the proviso for grafting; (ii) graft functional monomer; and (iii) a polymerizable monomelic solvent to enable a medium for polymerization. Also, discloses about the compositions comprising reactive solution of polymerizable polymer and its various possible applications.

9 Claims, No Drawings

REACTIVE SOLUTION OF POLYMERIZABLE POLYMER COMPRISING POLYMERIZABLE REACTIVE FUNCTIONALITIES, PROCESS AND COMPOSITIONS THEREOF

FILED OF THE INVENTION

The disclosure relates to reactive solutions of a polymerizable polymer comprising polymerizable reactive functionalities and a process for preparing the same. More particularly, it relates to copolymers of N-vinyl amide monomers comprising at least one polymerizable functionality for further polymerization. Also disclosed are compositions comprising a reactive solution of a polymerizable polymer and its applications.

BACKGROUND OF THE INVENTION

For many applications employing polymeric materials, cross-linking of the polymer is a critical and necessary step in preparing many commercially viable products. Historically, one approach to cross-linking a polymer has been to introduce a chemical component, commonly referred to as a "cross-linking agent." Typical examples of cross-linking agents are melamines, formaldehyde, chromates, polyfunctional silanes, zirconates, borates, polyfunctional acids and polyfunctional amines.

More recently, polymer(s) have been developed which do not require the addition of a cross-linking agent. Many of these polymers employ glycidyl or amine functionalities to enable the polymer to form covalent bonds to itself or other functional materials. This approach is advantageous because the cross-linking reaction is simple and the resultant product is a commercially viable polymeric material. For example, crosslinked polymers of N-vinyl amides, such as N-vinyl pyrrolidone (VP or HPVP) and N-vinyl caprolactum (VCL), can be made by the addition of glycidyl methacrylate (GMA) functionality according to BS. R Reddy et.al. Journal of Applied Polymer Science, Vol. 43, 251-258 (1991) and S. A. Sukhishvili et.al. Journal of Polymer Science: Part A—Polymer Chemistry Vol. 44, 183-191 (2006).

Also, EP0103184 assigned to Diamond Shamrock discloses hydrogel terpolymers of GMA (50%) and VP (40%) and hydroxyethylmethacrylate (HEMA, 10%). The U.S. Publication No. 20070056900 assigned to BASF discloses polymer comprising 60-99% by weight of at least one N-vinyl amide monomer (VP or VCL) and 1-40% by weight of at least one monomer selected from, for example GMA, HEMA, aminostyrene compounds and imidazoles.

Given the many uses for cross-linked polymeric materials, there is a need for cross-linkable polymers; the present invention is directed to polymers containing polymerizable functionalities.

SUMMARY OF THE INVENTION

It is a principal aspect of the present invention to provide a process for the preparation of reactive solution(s) of a polymerizable polymer comprising (a) at least one vinyl amide monomer, (b) at least one dual functional monomer having the structure of Q-R-E and (c) at least one polymerizable monomeric solvent to yield the desired polymerizable polymer solution wherein Q is a oxirane, oxetane, aziridine, oxazoline or benzoxazine moiety; E is a polymerizable functionality comprising an alkene or carbon-carbon double bond; and R is an aliphatic or aromatic moiety optionally containing a heteroatom.

Another aspect of the present invention is a process for the preparation of a reactive solution of polymerizable polymer comprising (a) a base polymer formed from at least one N-vinyl amide monomer and at least one co-monomer comprising a pendant chemical moiety having reactive functionality suitable for grafting a monomer (b) at least one grafting functional monomer having the structure of X—Y—Z and (c) at least one polymerizable monomeric solvent to yield the polymerizable polymer solution wherein, X is —COOH, —OH, —$NH_2$, —SH, —C≡N, —N═C═O, Cl, Br, an epoxy, oxirane, oxetane, aziridine, oxazoline or benzoxazine moiety; Z is polymerizable functionality comprising alkene or carbon-carbon double bond; and Y is an aliphatic or aromatic moiety optionally containing a heteroatom.

Further, grafting is accomplished by reacting or condensing the graft functional monomer with the reactive functionality of pendant chemical moiety of the base polymer.

DETAILED DESCRIPTION OF THE INVENTION

The singular forms "a," "an," and "the" include plural referents unless the context clearly dictates otherwise specified or dearly implied to the contrary by the context in which the reference is made. The claim "Comprising" and "Comprises of" includes the more restrictive claims such as "Consisting essentially of" and "Consisting of".

The term "crosslinked" herein refers to a composition containing intramolecular and/or intermolecular crosslinks, whether arising through covalent or noncovalent bonding. "Noncovalent" bonding includes both hydrogen bonding and electrostatic (ionic) bonding.

The term "about" can indicate a difference of 10 percent of the value specified. Numerical ranges as used herein are meant to include every number and subset of numbers enclosed within that range, whether particularly disclosed or not. All percentages, parts, proportions and ratios as used herein, are by weight of the total composition, unless otherwise specified.

The term "curing" throughout the specification and the claims refers to the process of converting a liquid to a solid by exposing it to appropriate energy source which is capable of curing. The resulting cured product is incapable of demonstrating a molecular weight as determined by gel permeation chromatography (GPC).

The term "polymerizable functionality" refers to a pendant group capable of being polymerized would selected from the group comprising but are not limited to alkylene, alkene, acrylate/methacrylate, and epoxy groups. The term "reactive functionality" refers to functional groups or a synthetic handle provided with suitable bond for condensing or reacting with another group or synthetic functional group or a bond. Wherein, the polymerizable functionality is a subset of a reactive functionality.

One embodiment of the invention is a process for the preparation of a reactive solution of polymerizable polymer comprising [a] (i) at least one vinyl amide monomer, (ii) at least one dual functional monomer having the structure of [Q-R-E] and [b] at least one polymerizable monomeric solvent to obtain the desired reactive solution of polymerizable polymer solution wherein, Q is oxirane, oxetane, aziridine, oxazoline or benzoxazine moiety; E is a polymerizable functionality comprising alkene or carbon-carbon double bond; and R is an aliphatic or aromatic moiety optionally containing a hetero atom.

Another embodiment of the present invention is a reactive solution of at least one polymerizable polymer comprising [a] (i) a base polymer formed from at least one N-vinyl amide monomer and at least one co-monomer comprising a pendant chemical moiety suitable for grafting, wherein said chemical moiety comprises a reactive functionality and (ii) at least one grafted functional monomer having the following representative structure of [X—Y—Z] and [b] at least one polymerizable monomeric solvent to obtain the desired reactive solution wherein, X is —COOH, —OH, —$NH_2$, nitrile, thiol, epoxy, oxirane, oxetane, aziridine, isocyanate, chloro, bromo, oxazoline or benzoxazine moiety; Y is a polymerizable functionality comprising alkene or carbon-carbon double bond; and Z is an aliphatic or aromatic moiety optionally containing a hetero atom. The grafting is accomplished by the addition of graft functional monomer to the base polymer and is polymerizable. The term "vinyl amide monomer" or "vinyl derived monomers" employed herein refers to such monomers as N-vinyl lactam monomer, a carboxy vinyl monomer, a vinyl ester monomer, an ester of a carboxy vinyl monomer, a vinyl amide monomer, and/or a hydroxy vinyl monomer capable of reacting or cross linking with any appropriately selected co-monomer to yield a polymer through hydrogen bonds, ionic bonds, and/or covalent bonds. More particularly selected vinyl derived monomers include but are not limited to N-vinyl pyrrolidone, N-vinyl valerolactam, N-vinyl caprolactam, formamide, N-vinyl carbazole alone or their appropriate combination.

According to one embodiment of the present invention, a polymerizable polymer comprises of dual functional monomer in one approach and graft functional monomer in another approach for the preparation of a reactive solution comprising a polymerizable polymer and are further detailed with the following representative generic structures.

[Q-R-E] or [X—Y—Z]

wherein, Q or X contains 3 or more carbon atoms containing cyclic ether or cyclic amine moities represented by the following formulae I, II or III, wherein R and $R_1$ is H, alkyl or aryl.

(I)

(II)

(III)

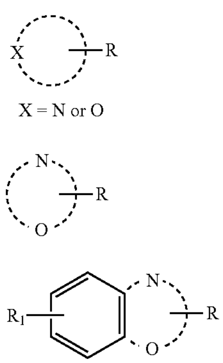

The 3- or more carbon atoms containing cyclic alkylene group compounds with ether or amine as part of the ring contained in the formulae (I) in a particular embodiment may be a cyclic ether or cyclic amine having 3 to 9 carbon atoms, and more particularly a cyclic ether or cyclic amine having 3 to 4 carbon atoms. In particular, the cyclic ether/cyclic amine defined in the formulae (I) preferably includes the following cyclic ethers/amine, from the viewpoint of present invention.

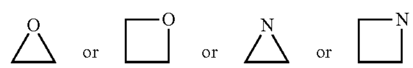

As per formulae (II), the particular heterocyclic compound having N and O hetero atoms as a part of their structure would include the following non-limiting isomers of oxazoline and their derivatives thereof wherein, $R_2$ each independently represents H or alkyl or aryl.

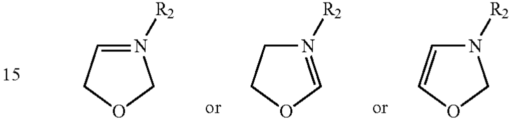

According to formulae (III), the particular heterocyclic compound having N and O hetero atoms as a part of their structure would include the following non-limiting isomers of benzoxazine and their derived compounds.

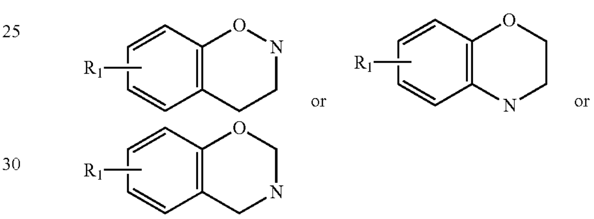

In addition to the above disclosed substitutions, X may be —COOH, —OH, —$NH_2$, —SH, —C≡N, —N=C=O, Cl, Br or epoxy wherein, the R of dual functional monomer (Q-R-E) and Y of the graft functional monomer [X—Y—Z] is an aliphatic or aromatic nucleus (e.g., a divalent nucleus) with the optional presence of heteroatoms therein. Further, the term alkyl herein includes but is not limited to an alkyl group having 1 to 16 (preferably 1 to 6, and more preferably 1 to 4) carbon atoms. Specifically, the alkyl group includes a methyl group, an ethyl group, a propyl group, an isopropyl group, a butyl group, a pentyl group, a hexyl group or long chain alkyl or the like. In the similar lines, the aryl group represented herein includes an aryl group having 6 to 12 (preferably 6 to 12, and more preferably 6 to 8) carbon atoms. Specifically, the aryl group includes a phenyl group, a biphenyl group, a benzyl group, preferably from a phenyl group, a benzyl group or the like.

The partial structure of dual functional monomer [Q-R-E] or graft functional monomer [X—Y—Z] of reactive solution, wherein the E or Z is a polymerizable functionality provided with carbon-carbon double bond (—C=C—).

In an embodiment, wherein, the polymerizable polymer comprising dual functional monomer is additionally comprising a pendant chemical moiety with a reactive functionality is suitably enabled for grafting with an selected monomer to yield a reactive solution comprising polymerizable polymer suitable for various applications after curing the same with appropriate technical aid. Also, the reactive solution of polymerizable polymer further comprises a polymerizable functionality incorporated into the polymerizable polymer via grafting and wherein the required monomer for grafting is added or condensed onto the polymerizable polymer either prior or after to the addition of at least one polymerizable monomeric solvent.

The term "grafting" refers to integration of a specific polymerizable functionality onto a pre-existing base polymer by chemically connecting the said functionality. The monomer employed herein for grafting purpose is termed as "graft monomer". The graft monomer is selected from the non-limiting group of compounds such as alkylamino derivatives of methacrylic acid and methacrylamide, acid anhydrides, unsaturated aliphatic acids, vinyl derivatives, silanes, oxirane based glycidyl ethers, epoxides, acrylic anhydride, oxazolines derivatives, benzoxazine derivatives, aziridine derivatives of methacrylates, isocyano derivatives of methacrylate and various allyl compounds. More particularly, the graft monomer is selected from the group consisting of dimethylaminoethyl methacrylate, dimethylaminopropylmethacrylamide, maleic anhydride, maleic acid, acrylic acid, methacrylic acid, vinyl imidazole, 4-vinyl aniline, trimethylvinylsilane, crotonic acid, vinyl sulfone, allyl glycidyl ether ([(2-propenyloxy) methyl]-oxirane), butadiene monoxide, 2-(1-aziridinyl)ethyl methacrylate, vinyl cyclohexene monoxide, 4-vinyl-1-cyclohexene-1,2-epoxide, 2-Isopropenyl-2-oxazoline, 2-isocyanatoethyl methacrylate, 1,3-diallyl-5-glycidylisocyanurate, tert-butylaminoethyl methacrylate, glycidyl N-(3-isopropenyl dimethylbenzyl) carbamate, 3-N-(6-propyl vinyl ether) benzoxazine, epichlorohydrin, 2-(3-methyl-3-oxetanemethoxy) ethyl vinyl ether, allyl alcohol, allyloxy ethanol, allyloxy methanol, allyl urea, allyl amide, glycidyl acrylates for example, glycidyl methacrylate and/or vinyl sulfonic acid. The "glycidyl acrylate" refers to alkyl acrylate monomers integrated with glycidyl functional groups and wherein, the preferable alkyl group having a chain length of $C_1$ to $C_{12}$ carbon atoms and it can be manipulated according to the artisan's requirement to achieve the desired composition. Exemplary alkyl acrylates monomers employed to prepare a reactive solution comprising polymerizable polymer include but are not limited to glycidyl methacrylate, glycidyl ethacrylate, glycidyl butylacrylate and/or glycidyl dodecylacrylate.

The epoxy derived compounds are often employed for grafting purpose in the above said embodiments of the present invention wherein the epoxy compounds are selected from the group of aromatic epoxides, alicyclic epoxides, and the like. The alicyclic epoxide compound comprises a cylcohexeneoxide or cyclopenteneoxide obtained by epoxidizing a compound having at least one cycloalkane ring such as cyclohexene or cyclopentene with an oxidizing agent such as hydrogen peroxide or a peracid. Whereas, the aromatic epoxides are preferably a di- or poly-glycidyl ethers prepared by reacting with a polyvalent phenol having at least one aromatic ring or the alkyleneoxide adduct thereof with epichlorohydrin for example, di- or poly-glycidyl ethers of bisphenol A.

Also, the monofunctional and polyfunctional epoxy compounds employed for the grafting purpose in the present invention and is detailed below.

The non-limiting examples of monofunctional epoxy compounds include phenyl glycidylether, p-tert-butylphenyl glycidylether, butyl glycidylether, 2-ethylhexyl glycidylether, allyl glycidylether, 1,2-butyleneoxide, 1,3-butadienemonooxide, 1,2-epoxydodecane, epichlorohydrin, 1,2-epoxydecane, styreneoxide, cyclohexeneoxide, 3-methacryloyloxymethylcylcohexeneoxide, 3-acryloyloxymethylcylcohexeneoxide, 3-vinylcylcohexeneoxide, and the like.

The non-limiting examples of multifunctional epoxy compounds include bisphenol A diglycidylether, bisphenol F diglycidylether, bisphenol S diglycidylether, brominated bisphenol A diglycidylether, brominated bisphenol F diglycidylethers, brominated bisphenol S diglycidylether, epoxy novolak resins, hydrogenated bisphenol A diglycidylethers, hydrogenated bisphenol F diglycidylethers, hydrogenated bisphenol S diglycidylethers, 3,4-epoxycyclohexylmethyl-3',4'-epoxycyclohexanecarboxylate, 2-(3,4-epoxycyclohexyl-5,5-spiro-3,4-epoxy) cyclohexane-meta-dioxane, bis(3,4-epoxycyclohexylmethyl) adipate, vinylcylcohexeneoxide, 4-vinylepoxycyclohexane, bis(3,4-epoxy-6-methylcyclohexylmethyl) adipate, 3,4-epoxy-6-methylcyclohexyl-3',4'-epoxy-6'-methylcyclohexane carboxylate, methylene-bis(3,4-epoxycyclohexane), dicyclopentadiene diepoxide, ethylene glycol di(3,4-epoxycyclohexylmethyl)ether, ethylene bis(3,4-epoxycyclohexanecarboxylate), epoxyhexahydrodioctyl phthalate, epoxyhexahydrodi-2-ethylhexyl phthalate, 1,4-butanediol diglycidylether, 1,6-hexanediol diglycidylether, glycerol triglycidylether, trimethylolpropane triglycidylether, polyethylene glycol diglycidylether, polypropylene glycol diglycidylether, 1,1,3-tetradecadienedioxide, limonenedioxide, 1,2,7,8-diepoxyoctane, 1,2,5,6-diepoxycyclooctane, and the like.

In accordance with one embodiment of the present invention, a polymerizable polymer of the reactive solution is a powder and is solublized by employing at least one polymerizable monomeric solvent which is capable forming a solution. Wherein, the polymerizable monomeric solvent is selected from the following non-limiting group of compounds such as vinyl amide monomers; oxetane; epoxy; glycidyl ether; and various mono, di, tri, tetra, penta, hexa acrylic and methacrylic derivatives having one or more of functional groups selected from hydroxy, alkoxy, aryloxy, alkyl, neopentyl, aryl, amino, diol, glycol, alkene glycol, polyethylene glycol or ester.

More particularly, the polymerizable monomeric solvent for solvating the produced polymerizable polymer is selected from the group including but are not limited to N-vinyl-2-pyrrolidone (VP), N-vinyl caprolactam (VCap), N-vinyl imidazole (VI), 2-hydroxy methyl methacrylate (HEMA), 2-hydroxy ethyl methacrylate (HEA), 4-hydroxy butyl acrylate, 2-phenoxy ethyl acrylate (PHEA), 2-(2-ethoxyethoxy)ethyl acrylate (EOEOEA), lauryl acrylate (LA), Stearyl acrylate (SA), isobornyl acrylate (IBOA), acrylic acid-2-ethylhexyl ester, acryloyl morpholine (ACMO), cyclic trimethylol-propane formal acrylate (CTFA), 3-(Methacryloylamino)propyl]trimethylammonium chloride (MAPTAC), (3-Acrylamidopropyl)trimethylammonium chloride (APTAC), 2-phenoxy ethyl acrylate (PHEA), C8-C10 acrylate (ODA), isodecyl acrylate (ISODA), lauryl methacrylate (LM), stearyl methacrylate (SM), 2,2,2-Trifluoroethyl methacrylate, 2-Acrylamido-2-methyl-1-propanesulfonic acid, 2-Acrylamido-2-methyl-1-propanesulfonic acid sodium salt, [2-(Methacryloyloxy)ethyl]dimethyl-(3-sulfopropyl)ammonium hydroxide, [3-(Methacryloylamino)propyl]dimethyl (3-sulfopropyl)ammonium hydroxide inner salt, 1,6-hexanediol diacrylate (HDDA), dipropylene glycol diacrylate (DPGDA), tripropylene glycol diacrylate (TPGDA), 1,4-butanediol diacrylate (BDDA), 1,9-nonanediol diacrylate (NNDA), neopentyl glycol diacrylate (NPGDA), propoxylated neopentyl glycol diacrylate (NPG2PODA), polyethylene glycol (200) diacrylate (PEG (200)DA), polyethylene glycol (400) diacrylate (PEG(400) DA), polyethylene glycol (600) diacrylate (PEG(600)DA), ethoxylated bisphenol-A diacrylate (BPA2EODA), triethylene glycol diacrylate (TEGDA), triethylene glycol dimethacrylate (TEGDMA), glycerol propoxylated triacrylate (GPTA), diethylene glycol dimethacrylate (DEGDMA), ethoxylated bisphenol-A dimethacrylate (BPA10EODMA), trimethylolpropane triacrylate (TMPTA), pentaerythritol triacrylate (PET3A), ethoxylated tri-methylolpropane triacrylate (TMP3EOTA), propxylated trimethylolpropane triacrylate (TMP3POTA), propoxylated glyceryl triacrylate (GPTA), trimethylolpropane trimethylacrylate (TMPTMA), ethoxylated trimethylolpropane tritnethacrylate (TMP3EOTMA), pentaerythritol tetraacrylate (PETA) dipentaerythritl hexaacrylate (DPHA), 3,4-Epoxycyclohexylmethyl-3,4-epoxycyclohexane carboxylate, 3-ethyl-3-((ethyloxetane-3-yl)methoxy) methyl)oxetane, isocyanate-functional unsaturated acrylic ester resin, urethane diacrylates oligomers, polyester acrylates, polyether acrylates, 1,4-butane-diol-monoacrylate and/or diglycidyl ether of 1,4-butanediol. Mixtures of monomers are also envisioned in the present invention.

The present invention relates to curing or cross-linking or polymerizing a polymerizable polymer is carried out by any appropriate method known or explored in the prior-arts by a person skilled in the art. Particularly, the polymerization of reactive solution comprising polymerizable polymer is carried out by employing any one of the method disclosed in "*Principles of Polymerization*" 4$^{th}$ edition, 2004, Wiley by George Odian and is referred and disclosed herein in its entirety. The preferable techniques or methods employed by the present invention to polymerize the polymers would include UV-radiation, UV-LED, laser beam, electron beam, gamma irradiation, free-radical, cationic, anionic, thermal, exposure to e-beam and/or by employing a high-energy source in presence of suitable photo initiator for the initiation of polymerization. Suitable source of radiation including but not limited to mercury, xenon, halogen, carbon arc lamps, sunlight, and radioactive sources.

In order to induce polymerization via irradiation, often an appropriate photoinitiator(s), which has high storage stability after being added, are incorporated to initiate the polymerization reaction system. Preferable photoinitiators are selected from the following non-limiting group or class of compounds such as 2-hydroxy-2-methyl-1-phenylpropane-1-one, 1-hydroxycyclohexyl phenyl ketone, and 2-methyl-1-[4-(methylthio)phenyl]-2-morphorinopropane-1-on; benzoins e.g. benzyl dimethyl ketal; benzophenones such as benzophenone, 4-phenylbenzophenone, and hydroxybenzophenone; thioxanthones such as isopropylthioxanthone and 2,4-diethylthioxanthone; acylphosphine oxides; and other special initiators such as methyl phenyl glyoxylate; bis[4-(di(4-(2-hydroxyethyl)phenyl)sulfonio)phenyl sulfide], a mixture of bis [4-diphenylsulfonio]phenyl)sulfide bis (hexafluoroantimonate and diphenyl-4-thiophenoxyphenylsulfonium hexafluoroantimonate, bis[4-(di(4-(2-hydroxyethyl)phenyl)sulfonio)phenyl sulfide], 5-2, 4-cyclopentadiene-1-yl-[(1,2,3,4,5,6-.eta.)-(1-methylethyl-) benzene]-iron (1+)-hexafluorophosphate(1−)), 4-(2-hydroxytetradecanyloxy) diphenyliodonium hexafluoroantimonate, (4-hydroxynaphtyl) dimethylsulfonium hexafluoroantimonate), triphenylsulfonium hexafluorophosphate, triphenylsulfonium hexafluoroantimonate, 4-methoxyphenyldiphenylsulfonium hexafluoroantimonate, 4-methoxyphenyliodonium hexafluoroantimonate, bis(4-tert-butylphenyl)iodonium tetrafluoroborate, (bis(4-tert-butylphenyl)iodonium hexafluorophosphate), (bis(4-tert-phenyl)iodonium hexafluoroantimonate), (bis[4-(diphenylsulfonio)phenyl]sulfide bis (hexafluorophosphate)), Aryldiazonium salts, diaryliodonium salts, triaylsulfonium salts, triarylselenonium salts, dialkylphenacylsulfonium salts, triarylsulfoxonium salts, aryloxydiarylsulfonium salts, and the like for example, triphenylsulfonium hexaflurophosphate, methyidiphenylsulfonium hexafluorophosphate, dimethylphenylsulfonium hexaflurophosphate, diphenyinapththylsulfonium hexaflurophosphate, di(methoxynapththyl)methylsulfonium hexaflurophosphate, (4-octyloxyphenyl) phenyl iodonium hexafluoro antimonate, (4-octyloxyphenyl) diphenyl sulfonium hexafluoro antimonate, (4-decyloxyphenyl) phenyl iodonium hexafluoro antimonite, (4-dodecyloxyphenyl) diphenyl sulfonium hexafluoroantimonate. Particularly, employed photoinitaitors include 10-biphenyl-4-yl-2-isopropyl-9H-thixanthen-10-ium hexafurophosphate, 4,4'-dimethyl iodonium hexaflurophosphate, mixed triarylsulfonium hexaflurophosphate salts and reaction products of polyol and 10-(2-carboxymethoxy)-biphenyl-4yl-2-isopropyl-9-oxo-9H-thioxanthen-10-ium hexaflruophosphate. Further, these photoinitiators are used alone or in combination thereof. Alternatively, if essential, the photoinitiator may be used by mixing it with one or more photopolymerization accelerator, such as a benzoic acid (e.g., 4-dimethylaminobenzoic acid) or a tertiary amine, in any appropriate ratio. The photoinitiator is preferably added to the photopolymerizable composition in the range of about 0.1% to about 20% by weight.

According to one embodiment of the present invention, the polymerizable polymer is produced through free-radical polymerization in presence of a free-radical initiator. The contemplated free radical initiator for polymerization would include but are not limited to various derivatives of peroxides, peresters and/or azo compounds. More particularly, selected from the group consisting of dicumyl peroxide, dibenzoyl peroxide, 2-butanone peroxide, tert-butyl perbenzoate, di-tert-butyl peroxide, 2,5-bis(tert-butylperoxy)-2,5-dimethylhexane, bis(tert-butyl peroxyisopropyl)benzene, and tert-butyl hydroperoxide), diacyl peroxides, cumene hydroperoxide, dialkyl peroxides, hydroperoxides, ketone peroxides, monoperoxycarbonates, peroxydicarbonates, peroxyesters, and peroxyketals, including tertiary butyl perbenzoate, tertiary butyl peroctoate in diallyl phthalate, diacetyl peroxide in dimethyl phthalate, dibenzoyl peroxide, 1-hydroxy cyclohexyl-1-phenyl ketone, bis (2,4,6-trimethyl benzoyl)phenyl phosphine, benzoin ethyl ether, 2,2-dimethoxy-2-phenyl acetophenone, di(p-chlorobenzoyl) peroxide in dibutyl phthalate, di(2,4-dichlorobenzoyl) peroxide with dibutyl phthalate, dilauroyl peroxide, methyl ethyl ketone peroxide, cyclohexanone peroxide in dibutyl phthalate, 3,5-dihydroxy-3,4-dimethyl-1,2-dioxacyclopentane, t-butylperoxy(2-ethyl hexanoate), caprylyl peroxide, 2,5-dimethyl-2,5-di(benzoyl peroxy) hexane, 1-hydroxy cyclohexyl hydroperoxide-1, t-butyl peroxy (2-ethyl butyrate), 2,5-dimethyl-2,5-bis(t-butyl peroxy) hexane, cumyl hydroperoxide, diacetyl peroxide, t-butyl hydroperoxide, ditertiary butyl peroxide, 3,5-dihydroxy-3,5-dimethyl-1,2-oxacyclopentane, and 1,1-bis(t-butyl peroxy)-3,3,5-trimethyl cyclohexane and di-(4-t-butyl cyclohexyl) peroxydicarbonate, azo compounds such as azobisisobutyronitrile and azobiscyclohexanenitrile (e.g., 2,2'-azobis(2-methyl-propanenitrile), 2,2'-azobis(2-methylbutanenitrile), and 1,1'-azobis(cyclohexanecarbonitrile)) and the like mixtures and combinations thereof. Alternatively, all of the above revealed free radical initiator can be used for thermal based polymerization alone or appropriate mixture thereof and wherein, the polymerization reaction is initiated through heat energy. Particular thermal initiator employed for the polymerization of polymer would comprise 2,2'-azobis (2,4-dimethylpentanenitrile), 2,2'-azobis (2-methylpropanenitrile), 2,2'-azobis (2-methylbutanenitrile), peroxides such as benzoyl peroxide, and the like. Preferably, the thermal initiator is 2,2'-azobis(isobutyronitrile).

The process for preparing a reactive solution comprising polymerizable polymer is (a) producing polymerizable polymer in a low boiling solvent, (b) eliminating the low boiling solvent at atmospheric or reduced pressure; and (c) replenishing with at least one higher boiling reactive solvent. Wherein, the solvent is selected from polar and non-polar category. The typical non-limiting example of the solvents employed in the process would include toluene, xylene, cyclohexanone, chlorobenzene, methyl ethyl ketone, dichlomethane, chloroform, chloromethane, dichloromethane, carbon tetrachloride, ethylene chloride, trichloroethane, ethyl acetate, n-propyl acetate, iso-propyl acetate, 2-nitropropane, any form of water (distilled, deionized or tap) and water miscible solvents such as tetrahydrofuran, acetone, dioxane, dimethyl formamide, dimethyl sulfoxide, ethanol, methanol, propanol, isopropanol, butanol, isobutanol, ethylene glycol, ethylene glycol monomethyl ether, and propylene glycol. Wherein, the solvent is eliminated from the reaction mixture employing suitable techniques that are known in the art to concentrate the reaction mixture, however, the preferable method of elimination is boiling, distilling, evaporating with or without vacuum.

The structure of polymerizable polymer present in the reactive solution is confirmed from appropriate spectral techniques that are known in the art and preferably employed spectral techniques would include $^{1}H$-NMR, $^{13}C$-NMR and FT-IR spectra.

The content of the reactive solution comprising specific polymerizable polymer compound is preferably about 1 to about 90 wt. %, more preferably about 1 to about 70 wt. %, and still more preferably about 1 to about 50 wt. %, based on a total solid content constituting the curable composition according to the invention.

In an embodiment of the invention, the polymerizable polymer essentially comprised of about 5 to 95 wt. % and more particularly about 20 to about 80 wt. % of N-vinyl amide monomer, about 0.5 to 60 wt. % and more particularly about 1 to about 30 wt. % of dual functional monomer having the structure of Q-R-E and about 1 to about 95 wt. % and more particularly about 1 to 80 wt. % of polymerizable monomeric solvent. The solvent may be a mixture of monomers or a mixture of reactive and non-reactive solvents.

In a further embodiment of the invention the polymerizable polymers is essentially comprised of a base polymer made of about 5 to 95 wt. % and more particularly about 10 to about 90 wt. % N-vinyl amide monomer and about 0.5 to 60 wt. % and more particularly about 1 to 30 wt. % a co-monomer suitable for or capable of grafting, and about 1 to about 95 wt. % and more particularly about 1 to 80 wt. % of polymerizable monomeric solvent. The solvent may be a mixture of monomers or a mixture of reactive and non-reactive solvents.

The polymers employed to produce the reactive solution is selected from non-ionic, anionic, cationic or thermoplastic in nature. Moreover, disclosed polymers and composition containing the polymers is suitable for extrusion and capable of forming extruded plastics containing polymers. The polymers may be used individually or in admixture with one another.

According to one aspect of the present invention, the composition also includes one or more additives in conventional quantities which may impart enhancement in the desired composition. These additives selected from but are not limited to pigments, oil, surfactant, slip modifiers, thixotropic agents, foaming agents, antifoaming agent, flow or rheology control agents, waxes, plasticizer, binder, antioxidant, photoinitiator, UV-light absorbers, stabilizer, fungicides, bactericides, organic/inorganic filler particles, conductive particles (i.e., silver and carbon), leveling agent, antistatic agent, dispersant, colorants, polymerization inhibitors, accelerators, viscosity modifier, therapeutic and/or preventive medicaments, and other ingredients apparent to those skilled in the art.

In a particular embodiment of the invention discloses the use of stabilizer to inhibit premature cross-linking. The stabilizers employed in the present invention are well known in the art, and include, but are not limited to hydroquinone, hydroquinone monomethyl ether, hydroquinone monopropyl ether, hydroquinone monobenzyl ether, amyl quinine, amyloxyhydroquinone, n-butylphenol, phenol, 4-methoxyphenol (MEHQ), phenothiazine, nitrobenzene and phenolic-thio compounds, alone or in combination thereof.

A selective embodiment of the present invention is to prepare a reactive solution composition comprising (i) a copolymer of n-vinyl-2-pyrrolidone and glycidyl methacrylate or a copolymer of n-vinyl caprolactum and glycidyl methacrylate; and (ii) at least one cationic polymerizable monomeric solvent selected from the group consisting of 3,4-epoxycyclohexylmethyl-3,4-epoxycyclohexane carboxylate, diglycidyl ether of 1,4-butanediol and/or 3-ethyl-3-((ethyloxetane-3-yl) methoxy)methyl)oxetane. Another reactive solution composition is (i) a terpolymer of N-vinyl-2-pyrrolidone, vinyl acetate and glycidyl methacrylate; and (ii) at least one cationic polymerizable monomeric solvent selected from the group consisting of 3,4-epoxycyclohexylmethyl-3,4-epoxycyclohexane carboxylate, diglycidyl ether of 1,4-butanediol, 3-ethyl-3-((ethyloxetane-3-yl)methoxy) methyl)oxetane. In similar lines, yet another reactive solution composition is (i) a terpolymer of N-vinyl caprolactam, 2-hydroxy ethyl methacrylate and dimethylaminopropylmethacrylamide and a graft polymer of glycidyl methacrylate; and (ii) free radically polymerizable monomer is 2-hydroxy ethyl methacrylate (HEMA). Yet another reactive solution composition is (i) a terpolymer of N-vinyl caprolactam, 2-hydroxyethyl acrylate, and 2-phenoxyethyl acrylate, grafted with acrylic anhydride; and (ii) 2-phenoxyethyl acrylate.

According to another aspect of the invention, the reactive solution comprising polymerizable polymer produced by curing through any of the aforesaid methods is formulated such that the a composition is useful in various applications such as industrial, personal care, household and pharmaceuticals. Exemplary and non-limiting applications of the proposed compositions are essentially in the field of coating-UV curable, anti-fog, hydrophilic enhancement agents for membranes, stabilization, microencapsulation additives, high dielectric constant material, reactive protective colloidal agent, functional silica particle, fiber sizing agent additive, cementious, conductive hydrogel, battery binding, UV absorber, photoinitiator, UV curable Ink, flocculating agent, surface modification agent, dispersant, cross-linking agent, grease resistant films, bio-adhesives, tablet coating, resinous photo-initiators, resinous UV absorber, iodine stabilizer, conduction coatings and gels, reactive rheology modifying agents, coating flex agents, non-migratory anti-static agents, cosmetics, hair care, toiletries, laundry and household and cleaning products, processing aids, medical stents, catheters, medical device coatings, optical lenses, novel drug delivery systems. Wherein, the composition is produced as solid, liquid or powder or in a solution form.

Further, the present invention is illustrated in detail by way of the below given examples. The examples are given herein for illustration of the invention and are not intended to be limiting thereof.

EXAMPLE 1

Solution Process for VP/VA/GMA Terpolymer

Two monomer/solvent blends were prepared. Wherein, the heal is a thoroughly blended mixture of 5 g N-vinyl-2-pyrrolidone (VP), 5 g of vinyl acetate (VA), 4 g glycidyl methacrylate (GMA), and 210 g acetone. The Feed 1 was thoroughly blended mixture of 40 g of VP, 8 g of VA, 4 g of GMA and 24 g of acetone. To a 500 mL glass reaction vessel, equipped with a magnetic agitator, an addition funnel, and a chilled condenser, the heal and 5 g of Feed 1 were charged. The remaining Feed 1 was charged into the pump. The purging of reaction vessel was initiated with continuous nitrogen supply. The reaction vessel was heated to reflux approximately at ~50° C. In another separate vessel, a mixture of 0.50 g of 2,2'-azobis(2,4-dimethylpentanenitrile) and 5 g of acetone (Feed 2) was prepared. When the reaction flask has reached reflux temperature, 1 g of Feed 2 was charged into the reaction vessel. Then, a continuous, drop-wise addition of Feed 1 over a period of two hours was commenced. After 30 minutes, 1 g of Feed 2 was charged into the reaction vessel. Addition of this Feed 2 was repeated for next one hour. At the completion of Feed 2 additions, the reaction vessel was allowed to elapse one hour, and then the reaction vessel was charged with another 1 g of initiator. The reaction vessel was allowed to heat at reflux an additional 2 hours. Note that during the initiator shots, additional acetone was added to replace any that had volatilized. At the end of another one hour hold, the reaction vessel was cooled to room temperature. A representative structure for the product obtained in the polymeric reaction is presented below, wherein x+y+z=100:

The 100 g of the reaction product was placed in acetone (~22% solids) and 124 g of 3,4-Epoxycylcohexymethyl-3,4-epoxycyclohexanecarboxylate monomer was added. Under high vacuum, at room temperature and agitation, the acetone was carefully stripped out of the solution to obtain our desired product in the form of viscous liquid. The Brookfield viscosity of the resulting clear, reactive polymer solution is ~6,000 cPs.

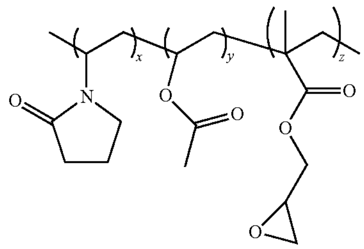

EXAMPLE 2

Powder Process for VCap/DMAPMA/HEMA Terpolymer

Five hundred grams (500 g) of de-ionized water was added to 1000 g of a 30% aqueous solution of a terpolymer of vinyl caprolactam (VCap), dimethylamino propyl methacrylamide (DMAPMA), and 2-hydroxyethyl methacrylate (HEMA). GMA (12 g) was added drop-wise with continuous stirring. The obtained solution was heated at 60° C. for one hour. The resulting product was freeze dried to render a solid, white powder. A representative structure for the polymeric reaction is presented below, wherein x+y+z+a=100:

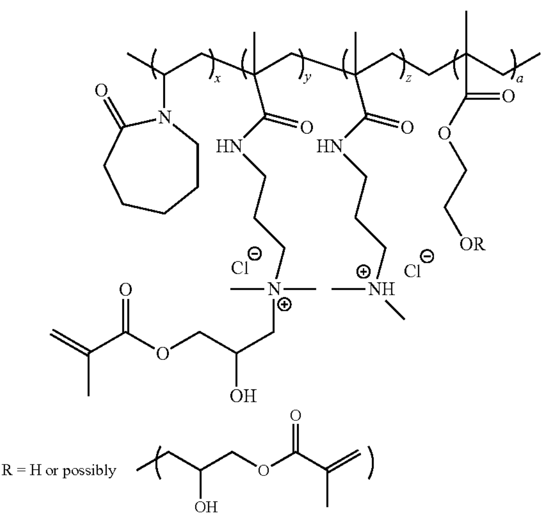

30 g of this solid polymeric powder was added to 170 g of HEMA. The Brookfield viscosity of the resulting clear, reactive polymer solution is ~600 cPs. Based on examples 1 and 2 above it will be appreciated that one embodiment of the invention is solutions having a brookfield viscosity of about 300 to 10,000 cPs and more particularly, about 400 to 8,000 cPs and more particularly about 600 to 6,000 cPs.

EXAMPLE 3

Solution Process for VCap/PEA/HEA Terpolymer

Feed 1 is prepared with 70 grams of vinyl caprolactam (VCap), 20 grams of phenoxy ethyl acrylate (PEA) and 30 grams of 2-hydroxyethyl acrylate (HEA) for pumping. Put 230 g of ethanol into the reactor. Commence purging of the reaction vessel with nitrogen. Heating flask containing ethanol to reflux, approximately ~78° C. In another separate vessel, prepare a mixture of 1 g of Lupersol 11 and 5 g of acetone. When the reaction flask has reached reflux temperature, begin feeding 1 into the reaction vessel. After 10 minutes of monomer feed, add 1 g of the initiator solution into the reactor. Continue the drop-wise addition of Feed 1 over a period of approximately two hours. While the monomers are feeding into the reactor, after 30 minutes, charge 1 g of the initiator solution into the reaction vessel. After 30 minutes charge 1 g of initiator solution into the reactor. After 30 minutes charge 1 g of initiator solution into the reactor. At the completion of the monomer feeds, charge the reaction vessel with a final 1 g addition of initiator solution. The reaction vessel is allowed to heat at reflux an additional 3 hours. Cooled the reaction vessel to room temperature. Leave material in reactor. Re-heat to about 60 then charge with 0.5 gram of Lupersol 11 hold for two hours. Add another 0.5 grams of Lupersol 11 and hold for 5 hours then cool. Remove the solvent via vacuum drying.

5.65 grams solid polymer is then re-dissolved into 400 grams of methyl ethyl ketone in a round bottom flask. 2.5 grams of triethylamine and 0.2 grams of dimethylaminopyridine are added to the flask, 2.7 grams of methacrylic anhydride is added and stirred at room temperature for 20 hours. The solvent is then removed via vacuum oven, A representative structure for the product obtained in the polymeric reaction is presented below, wherein x+y+z+a=100 and the approximate molecular weight of the polymer is 10,000 g/mole:

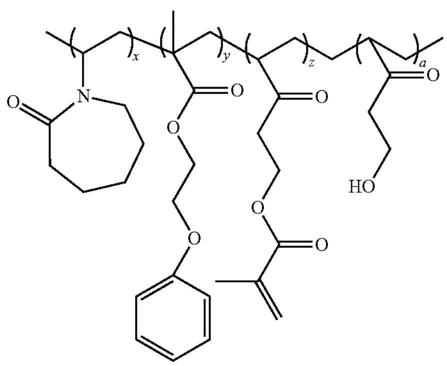

The 20 g of the reaction product was placed in 80 grams of 2-phenoxy ethyl acrylate to yield a UV curable, polymerizable polymer in a monomer product.

EXAMPLE 4

Solution Process for VCap/PEA/HEA Terpolymer

Feed 1 is prepared with 70 grams of vinyl caprolactam (VCap), 20 grams of phenoxy ethyl acrylate (PEA) and 30 grams of 2-hydroxyethyl acrylate (HEA) for pumping. Put 230 g of ethanol into the reactor. Commence purging of the reaction vessel with nitrogen. Heating flask containing ethanol to reflux, approximately ~78° C. In another separate vessel, prepare a mixture of 1 g of Lupersol 11 and 5 g of acetone. When the reaction flask has reached reflux temperature, begin feeding 1 into the reaction vessel. After 10 minutes of monomer feed, add 1 g of the initiator solution into the reactor. Continue the drop-wise addition of Feed 1 over a period of approximately two hours. While the monomers are feeding into the reactor, after 30 minutes, charge 1 g of the initiator solution into the reaction vessel. After 30 minutes charge 1 g of initiator solution into the reactor. After 30 minutes charge 1 g of initiator solution into the reactor. At the completion of the monomer feeds, charge the reaction vessel with a final 1 g addition of initiator solution. The reaction vessel is allowed to heat at reflux an additional 3 hours. Cooled the reaction vessel to room temperature. Leave material in reactor. Re-heat to about 60 then charge with 0.5 gram of Lupersol 11 hold for two hours. Add another 0.5 grams of Lupersol 11 and hold for 5 hours then cool. Remove the solvent via vacuum drying.

60.4 grams solid polymer is then re-dissolved into 279.3 grams of acetone in a round bottom flask. 27.9 grams of triethylamine and 2.2 grams of dimethylaminopyridine are added to the flask. 30.2 grams of methacrylic anhydride is added and stirred at room temperature for 20 hours. The solvent is then removed via vacuum oven. A representative structure for the product obtained in the polymeric reaction is presented below, wherein x+y+z+a=100:

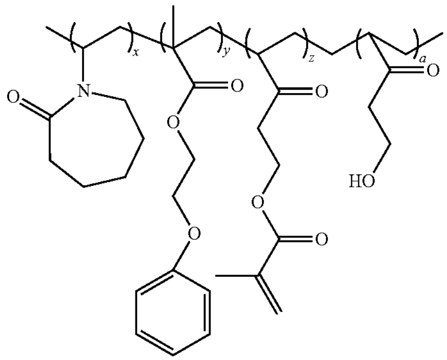

The 20 g of the reaction product was placed in 80 grams of 2-phenoxy ethyl acrylate to yield a UV curable, polymerizable polymer in a monomer product.

EXAMPLE 5

Powder Process for VCap/DMAPMA/HEMA Terpolymer

The 30 g of a terpolymer of vinyl caprolactam (VCap), dimethylamino propyl methacrylamide (DMAPMA), and 2-hydroxyethyl methacrylate (HEMA) powder was added to 170 g HEMA. GMA (12 g) was added drop-wise with continuous stirring. This solution was heated at 40° C. for one hour. A representative structure for the polymeric reaction is presented below, wherein x+y+z+a=100:

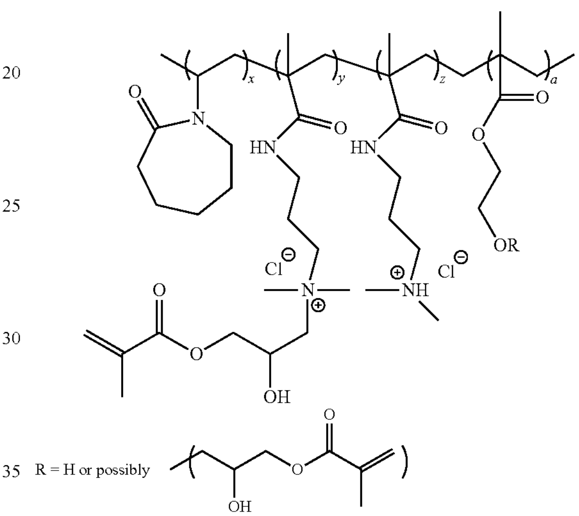

EXAMPLE 6

Acrylated Lactam Polymer in Monomer where Acrylated Polymer is Isolated via a Polymer Precipitation Process Feed 1 is 70 grams of N-vinyl caprolactam (VCap), 20 grams of 2-phenoxyethyl acrylate (PEA) and 30 grams of glycidyl methacrylate (GMA) is prepared for pumping.

Feed 2 is 10 grams of vinyl acetate (VA) and 10 grams of acetone is prepared for pumping.

Acetone (230 gms) was placed in reactor and purging of the reaction vessel was initiated with nitrogen gas. The reaction vessel containing acetone was heated to reflux ~55° C. In another separate vessel, a solution containing a mixture of 1 gram of Lupersol 11 (t-butye peroxypivalate) and 5 grams acetone was prepared. When the content of the reaction flask reached reflux temperature, drop-wise feeding of Feed 1 and Feed 2 were commenced into the reaction vessel. The feed rate of Feed 2 (VA) was about half the feed rate of the Feed 1 (VCap/PEA/GMA blend). After 10 minutes of monomer feed, 1 gram of the initiator solution was added into the reactor and the drop-wise addition of Feed 1 and Feed 2 were continued for over a period of approximately two hours. After 30 minutes of initiation of this two hour process of monomer feedings, again 1 gm of the initiator solution was charged in to the reaction vessel. At the completion of the monomer feedings, the reaction vessel was charged with 1 gm of initiator solution. Then, the reaction vessel was allowed to heat at reflux an additional 3 hours. Note that during the initiator shots, additional shots, additional acetone was added to replace any that had volatilized during the reflux process. The reaction vessel was cooled to room temperature and the reaction product was left-out in the reactor. The reaction vessel containing reaction product was re-heated to about 60° C. and then 0.5 gm of Lupersol 11 was charged and it was kept undisturbed for 2 hours. Again 0.5 gm of Lupersol 11 was added to the undisturbed reaction product and it was kept uninterrupted for another 5 hours and it was allowed cool. Finally the vacuum dried product yields desired solid copolymer of the monomers.

Acrylation Process of copolymer:

The 20 grains of VCap/VA/GMA/PEA copolymer was added to a 1 liter round bottom flask equipped with a reflux condenser which is continuously sparged with compressed air. The xylene (600 ml) was added with continuous stirring and 4-methoxyphenol (MEHQ, 0.56 grams) was also added to this flask. Further 15 ml of acrylic acid was added in a drop-wise manner to the above solution. Triethylamine (1 gram) was added to this collective solution and was stirred at room temperature for 2 hours. The temperature of this solution was gradually raised to 125° C. in 3 hours span, maintaining the solution at this temperature, 50 mL of n-propanol was added in a drop-wise manner over a period of 2 hours. The content of the reaction flask was cooled to room temperature and the reaction product was passed through #3 filter. The filtered solution was slowly introduced to heptanes to enable the precipitation of polymer product of our interest. The resulting polymer product is yellowish in color, semi-solid in nature with the following structure.

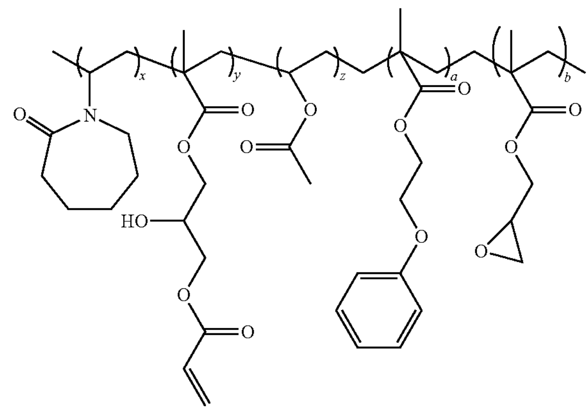

The reaction product (FRP) is then dissolved in 2-phenoxy ethyl acrylate (THEA) at 10% wt/wt.

TABLE 1

| Coating Formulation for Clear Polyester | | | |
|---|---|---|---|
| Material, g | FRP-1 | FRP-2 | FRP-3 |
| 90/10 2PEA/FRP | 5 | 4.5 | 4 |
| PETA | 0.5 | 1 | 1.5 |
| Irgacure 184 | 0.3 | 0.3 | 0.3 |

TABLE 2

| | FRP-1 | FRP-2 | FRP-3 |
|---|---|---|---|
| Formulation based on % solids<br>Coating Formulation for Clear Polyester Report by Weight % | | | |
| % Component | | | |
| FRP | 8.9 | 8 | 7.1 |
| PEA | 77.3 | 69.6 | 61.9 |
| PETA | 8.6 | 17.2 | 25.8 |
| Irgacure 184 | 0.3 | 5.2 | 5.2 |
| Physical Properties of FRP Coatings | | | |
| Property | | | |
| Appearance | Clear and smooth with some pin holes | Clear and smooth with some pin holes | Clear and smooth with some pin holes |
| Pencil Hardness | 2B | 3H | 8H |
| X-hatch | Good, no removal | Good, no removal | Good, no removal |
| Taber abrasion | Abrades but no removal | Abrades but no removal | Abrades but no removal |
| MEK rubs | Some coating removal with 200 rubs | No removal, or blistering | No removal, or blistering |

EXAMPLE 7

Powder Process for VCap/PEA/Isocyanoethyl-Methacrylate Terpolymer 239 grams toluene was charged to a 1 liter round bottom flask equipped with a nitrogen spurge and a reflux condenser. The solvent is heated to reflux. 69.6 grams of vinyl caprolactam (VCap), 76.8 grams of 2-phenoxy ethyl acrylate (PEA), and 15.5 grams of 2-isocyanatoethyl methacrylate are mixed and added to the reactor over a period of 180 minutes. Concurrently, a mixture of 12 grams of 75% t-butyl peracetate in mineral spirits and 20 grams of toluene is added drop-wise to the reaction flask over a period of 210 minutes. At the end of the monomer and initiator feeds, the reaction is held at reflux for an additional 120 minutes. The polymer is precipitated in heptane and vacuum dried. A representative structure for the polymeric reaction is presented below, wherein x+y+z=100:

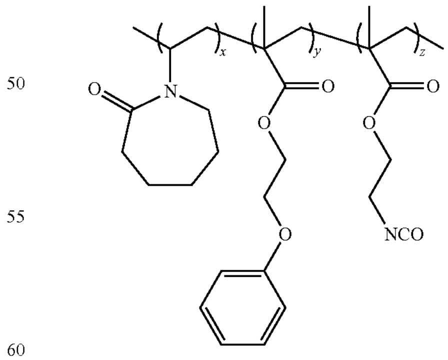

10 g of this solid polymeric powder was added to 90 g of Laromer 9000, a low-viscous isocyanate-functional unsaturated acrylic ester resin.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A reactive solution of at least one polymerizable polymer comprising:

(a) a polymerizable polymer comprising:

i. at least one N-vinyl amide monomer; and ii. at least one dual functional monomer having the structure

Q-R-E wherein, Q is a oxirane, oxetane, aziridine, oxazoline or benzoxazine moiety;

E is a polymerizable functionality containing a carbon-carbon double bond;

R is an aliphatic and/or aromatic moiety with or without a hetero-atom; and (b) at least one polymerizable monomeric solvent.

2. The reactive solution according to claim 1, wherein said dual functional monomer includes a pendant chemical moiety with reactive functionality that is capable of grafting with a grafting monomer.

3. The reactive solution according to claim 2, wherein said grafting monomer is selected from the group consisting of dimethylaminoethyl methacrylate, dimethylaminopropylmethacrylamide, maleic anhydride, acrylic anhydride, maleic acid, acrylic acid, vinyl imidazole, 4-vinyl aniline, trimethylvinylsilane, crotonic acid, vinyl sulfone, allyl glycidyl ether ([(2-propenyloxy)methyl]-oxirane), epichlorohydrin, butadiene monoxide, 2-(1-aziridinyl)ethyl methacrylate, vinyl cyclohexene monoxide, 4-vinyl-1-cyclohexene-I,2-epoxide, 2-isopropenyl-2-oxazoline, 2-isocyanatoethyl methacrylate, 1,3-diallyl-5-glycidylisocyanurate, glycidyl N-(3-isopropenyl dimethylbenzyl)carbamate, 3-N-(6-propyl vinyl ether) benzoxazine, epichlorohydrin, 2-(3-methyl-3-oxetanemethoxy) ethyl vinyl ether, allyl alcohol, allyloxy ethanol, allyloxy methanol, allyl urea, allyl chloride, allyl amide, glycidyl methacrylate and vinyl sulfonic acid.

4. The reactive solution according to claim 1, wherein the polymerizable polymer further comprises an additional polymerizable functionality incorporated into the polymerizable polymer via grafting and wherein said grafting monomer is added either prior or after to the addition of the polymerizable monomeric solvent; and the grafting monomer is selected from the group consisting of dimethylaminoethyl methacrylate, dimethylaminopropylmethacrylamide, maleic anhydride, acrylic anhydride, maleic acid, acrylic acid, vinyl imidazole, 4-vinyl aniline, trimethylvinylsilane, crotonic acid, vinyl sulfone, allyl glycidyl ether ([(2-propenyloxy)methyl]-oxirane), butadiene monoxide, 2-(1-aziridinyl)ethyl methacrylate, vinyl cyclohexene monoxide, 4-vinyl-1-cyclohexene-1,2-epoxide, 2-Isopropenyl-2-oxazoline, 2-isocyanatoethyl methacrylate, 1,3-diallyl-5-glycidylisocyanurate, glycidyl N-(3-isopropenyl dimethylbenzyl)carbamate, 3-N-(6-propyl vinyl ether) benzoxazine, epichlorohydrin, 2-(3-methyl-3-oxetanemethoxy) ethyl vinyl ether, allyl alcohol, allyloxy ethanol, allyloxy methanol, allyl urea, allyl amide, allyl chloride, glycidyl methacrylate and/or vinyl sulfonic acid.

5. The reactive solution according to claim 4, wherein said polymerizable monomeric solvent is selected from the group consisting of N-vinyl-2-pyiTolidone (VP), N-vinyl caprolactam (VCap), N-vinyl imidazole (VI), 2-hydroxy methyl methacrylate (HEMA), 2-hydroxy ethyl methacrylate (HEA), 2-phenoxy ethyl acrylate (PHEA), 2-(2-ethoxyethoxyl)ethyl acrylate (EOEOEA), lauryl acrylate (LA), Stearyl acrylate (SA), isobornyl acrylate (IBOA), acrylic acid-2-ethylhexyl ester, acryloyl morpholine (ACMO), cyclic trimethylol-propane formal acrylate (CTFA), C8-C10 acrylate (ODA), isodecyl acrylate (ISODA), lauryl methacrylate (LM), stearyl methacrylate (SM), 1,6-hexanediol diacrylate (HDDA), dipropylene glycol diacrylate (DPGDA), tripropylene glycol diacrylate (TPGDA), 1,4-butanediol diacrylate (BDDA), 1,9-nonanediol diacrylate (NNDA), neopentyl glycol diacrylate (NPGDA), propoxylated neopentyl glycol diacrylate (NPG2PODA), polyethylene glycol (200) diacrylate (PEG(200)DA), polyethylene glycol (400) diacrylate (PEG(400)DA), polyethylene glycol (600) diacrylate (PEG(600)DA), ethoxylated bisphenol-A diacrylate (BPA2EODA), triethylene glycol diacrylate (TEGDA), triethylene glycol dimethacrylate (TEGDMA), diethylene glycol dimethacrylate (DEGDMA), ethoxylated bisphenol-A dimethacrylate (BPA1 OEODMA), trimethylolpropane triacrylate (TMPTA), pentaerythritol triacrylate (PET3A), ethoxylated tri-methylolpropane triacrylate (TMP3EOTA), propxylated tri-methylolpropane triacrylate (TMP3POTA), propoxylated glyceryl triacrylate (GPT A), trimethylolpropane trimethylacrylate (TMPTMA), ethoxylated trimethylolpropane trimethacrylate (TMP3EOTMA), pentaerythritol tetraacrylate (PETA) dipentaerythritl hexaacrylate (DPHA), 3,4-Epoxycyclohexylmethyl-3,4-epoxycyclohexane carboxylate, 3-ethyl-3-((ethyloxetane-3-yl)methoxy) methyl) oxetane, 1,4-butane-diol-monoacrylate and/or diglycidyl ether of 1,4-butanediol.

6. A process for preparing the reactive solution of claim 1 comprising the steps of:

i. producing polymerizable polymer in a low boiling solvent;

ii. eliminating the low boiling solvent at atmospheric or reduced pressure; and iii. replenishing with at least one higher boiling reactive solvent.

7. The process of claim 6 further comprising the steps of:

iv. grafting a polymerizable functionality onto the polymer;

v. isolating the polymerizable polymer via precipitation; and vi. re-solubilizing the polymerizable polymer in a reactive solvent.

8. A reactive solution composition of claim 1 comprising:

i. a copolymer of N-vinyl-2-pyrrolidone and glycidyl methacrylate or a copolymer of N-vinyl caprolactam and glycidyl methacrylate; and ii. at least one cationic polymerizable monomeric solvent selected from the group consisting of 3,4-Epoxycyclohexylmethyl-3,4-epoxycyclohexane carboxylate, diglycidyl ether of 1,4-butanediol, 3-ethyl-3-((ethyloxetane-3-yl)methoxy) methyl)oxetane.

9. The reactive solution composition of claim 1 comprising:

i. a terpolymer of N-vinyl-2-pyrrolidone, vinyl acetate and glycidyl methacrylate; and ii. at least one cationic polymerizable monomeric solvent selected from the group consisting of 3,4-epoxycyclohexylmethyl-3,4-epoxycyclohexane carboxylate, diglycidyl ether of I,4-butanediol, 3-ethyl-3-((ethyloxetane-3-yl)methoxy) methyl)oxetane.

* * * * *